(No Model.)
R. L. RAY.
FIVE HORSE EVENER.
No. 364,435. Patented June 7, 1887.
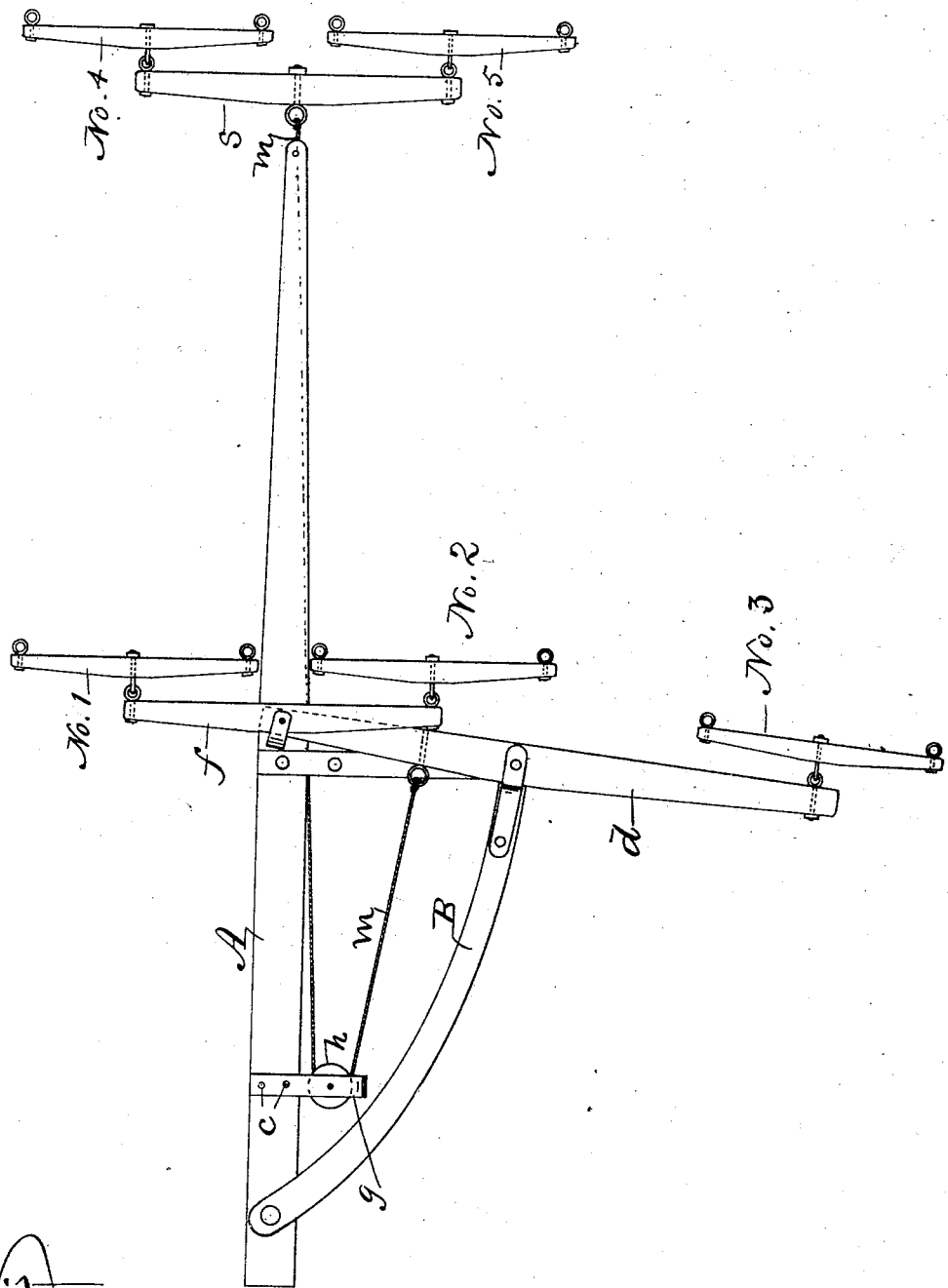
Witnesses:
R. H. Orwig.
C. M. Stiles
Inventor:
Robert L. Ray
By Thomas G. Orwig, Atty.

UNITED STATES PATENT OFFICE.

ROBERT L. RAY, OF UNION, SHELBY COUNTY, IOWA.

FIVE-HORSE EVENER.

SPECIFICATION forming part of Letters Patent No. 364,435, dated June 7, 1887.

Application filed March 2, 1886. Renewed April 8, 1887. Serial No. 234,168. (No model.)

*To all whom it may concern:*

Be it known that I, ROBERT L. RAY, a citizen of the United States of America, and a resident of Union township, in the county of Shelby and State of Iowa, have invented a Five-Horse Evener, of which the following is a specification.

My object is to provide a means for hitching five horses to a wagon, reaper, gang-plow, or any other movable machine or object in such a manner as to equalize their draft and concentrate their forces in a central line, so that there will be no side draft.

My invention consists in the construction and combination of three doubletrees, five singletrees, a rope and pulley, and a V shaped frame with a pole, as hereinafter set forth, pointed out in my claims, and illustrated in the accompanying drawing, in which the figure is a plan view.

A represents a tongue or pole adapted to be fixed to a wagon or machine.

B is a V-shaped metal frame fixed to the rear portion of the pole to project laterally. The ends of the branches of the frame are preferably bifurcated, so that they will slip over the pole to be rigidly fixed to the pole by means of bolts *c*, or in any suitable way.

*d* is a long doubletree pivoted to the free end and point of the V-shaped frame B.

*f* is a short doubletree pivoted to the inner end of the doubletree *d*.

Nos. 1 and 2 are singletrees flexibly connected with the ends of the doubletree *f*.

No. 3 is a singletree connected with the outer end of the long doubletree *d*.

*g* is a pulley-bearer fixed to the pole A in rear of the frame B.

*h* is a pulley in the bearer *g*.

*m* is a rope or chain fixed to the long doubletree *d* at a central position between its inner end and its pivot *n*, and from thence passed over the pulley *h*, and then forward through an eye or bearing fixed to the under side of the pole.

*s* is a doubletree fixed to the front and free end of the rope *m*.

Nos. 4 and 5 are singletrees connected with the ends of the doubletree *s*. Each one of the singletrees is flexibly connected with the end of a doubletree by means of common hooks and eyes, or in any suitable way.

In the practical use of my invention as a five-horse evener I hitch a horse to each one of the singletrees Nos. 1, 2, 3, in such a manner that they will be in parallel position with the pole and abreast with each other—two on one side of the pole and one on the other side—and also hitch a horse to each one of the Nos. 4 and 5 singletrees in front of the pole. The joint force and draft of the three horses abreast with each other will be equalized as it is transmitted to the pole and the center of the load to be moved through the medium of the doubletrees *d* and *f* and the frame B, while at the same time the joint force of the draft applied by the two horses in front of the pole will be united and equalized with the draft applied by the three horses at the rear of the pole through the medium of the rope *m* and pulley *h*.

To operate my device as a four horse evener, I remove the doubletree *s* from the end of the rope, substitute a singletree, and hitch only one horse in front of the pole.

I claim as my invention—

1. A five-horse evener composed of a pole having a fixed frame extending laterally from its rear portion, a long doubletree pivoted to the free end of said frame and having a singletree at its outer end, a doubletree having a singletree at each end pivoted to the inner end of the long doubletree, a rope or chain fixed centrally to the inner half of the said long doubletree, a pulley in a bearing fixed to the rear portion of the pole, and a doubletree having a singletree at each end attached to the free end of the rope and in front of the end of the pole, to operate in the manner set forth.

2. The pole A, having a fixed frame, B, and fixed pulley-bearer *g*, the doubletree *d*, having a singletree at its outer end, the doubletree *f*, having a singletree at each end, the rope *m*, the pulley *h*, and the doubletree *s*, having a singletree at each end, arranged and combined substantially as shown and described, for the purposes stated.

ROBERT L. RAY.

Witnesses:
O. M. BRUCE,
C. F. DARNALL.